United States Patent [19]
Lin et al.

[11] Patent Number: 4,758,276
[45] Date of Patent: Jul. 19, 1988

[54] STEARIC ACID-CONTAINING INK JET INKS
[75] Inventors: An-Chun R. Lin, New Town; Richard G. Whitfield, Brookfield; Theodore M. Cooke, Danbury, all of Conn.
[73] Assignee: Dataproducts Corporation, Woodland Hills, Calif.
[21] Appl. No.: 909,007
[22] Filed: Sep. 16, 1986

Related U.S. Application Data

[60] Division of Ser. No. 803,038, Nov. 27, 1985, abandoned, which is a continuation of Ser. No. 565,124, Dec. 23, 1983, abandoned, which is a division of Ser. No. 394,153, Jul. 1, 1982, abandoned, and a continuation-in-part of Ser. No. 507,918, Jun. 27, 1983, Pat. No. 4,484,984, which is a continuation of Ser. No. 331,604, Dec. 17, 1981, Pat. No. 4,390,369.

[51] Int. Cl.$^4$ ............................................. C09D 11/06
[52] U.S. Cl. ........................................ 106/27; 106/22; 106/31; 346/1.1
[58] Field of Search ....................... 106/27, 31, 20, 22; 346/1.1

[56] References Cited

U.S. PATENT DOCUMENTS

| | | | |
|---|---|---|---|
| 2,426,248 | 8/1947 | Sugarman | 106/23 |
| 3,282,709 | 11/1966 | Ehrhardt et al. | 106/27 |
| 3,282,853 | 11/1966 | Bennett | 252/172 |
| 3,330,673 | 7/1967 | Voet et al. | 106/32 |
| 3,353,974 | 11/1967 | Trimble et al. | 106/31 |
| 3,382,088 | 5/1968 | Noda | 106/27 |
| 3,421,910 | 1/1969 | Gilson et al. | 106/14.5 |
| 3,653,932 | 4/1972 | Berry et al. | 106/22 |
| 3,715,219 | 2/1973 | Kurz et al. | 106/22 |
| 3,846,141 | 11/1974 | Ostergren | 106/22 |
| 3,994,736 | 11/1976 | Hertz et al. | 106/22 |
| 4,005,237 | 1/1977 | Panken | 428/195 |
| 4,038,297 | 7/1977 | Rodenberg et al. | 106/27 |
| 4,069,179 | 1/1978 | Jones | 106/27 |
| 4,108,671 | 8/1978 | Richlin | 106/22 |
| 4,136,076 | 1/1979 | Daniels | 346/75 |
| 4,150,997 | 4/1979 | Hayes | 106/15.05 |
| 4,153,467 | 5/1979 | Yano et al. | 106/20 |
| 4,165,399 | 8/1979 | Germonprez | 427/264 |
| 4,176,361 | 12/1979 | Kawada et al. | 346/1.1 |
| 4,197,135 | 4/1980 | Bailey et al. | 106/23 |
| 4,238,807 | 12/1980 | Bovio et al. | 346/140 R |
| 4,243,994 | 1/1981 | Kobayashi et al. | 346/140 |
| 4,248,746 | 2/1981 | Greiner | 260/23 |
| 4,250,512 | 2/1981 | Kattner et al. | 346/140 |
| 4,273,847 | 6/1981 | Lennon et al. | 430/106 |
| 4,279,653 | 7/1981 | Makishima et al. | 106/22 |
| 4,281,329 | 7/1981 | Yano et al. | 346/1.1 |
| 4,312,009 | 1/1982 | Lange | 346/140 |
| 4,337,183 | 6/1982 | Santiago | 524/446 |
| 4,343,653 | 8/1982 | Beach et al. | 106/22 |
| 4,353,078 | 10/1982 | Lee et al. | 346/140 |
| 4,361,843 | 11/1982 | Cooke et al. | 346/1.1 |
| 4,382,946 | 6/1982 | Uehara | 546/208 |
| 4,386,961 | 6/1983 | Lin | 106/22 |
| 4,390,369 | 6/1983 | Merritt et al. | 106/31 |
| 4,395,287 | 7/1983 | Kobayashi et al. | 106/20 |
| 4,396,429 | 8/1983 | Matsumoto et al. | 106/20 |
| 4,400,215 | 8/1983 | Cooke | 106/22 |
| 4,409,040 | 10/1983 | Tabayashi et al. | 106/20 |
| 4,421,559 | 12/1983 | Owatari | 106/20 |
| 4,426,227 | 1/1984 | Keeling et al. | 106/27 |
| 4,443,820 | 4/1984 | Mutoh et al. | 358/296 |
| 4,475,113 | 10/1984 | Lee et al. | 346/1.1 |
| 4,490,731 | 12/1984 | Vaught | 346/140 R |
| 4,531,976 | 7/1985 | Lin | 106/27 |
| 4,537,631 | 8/1985 | Cooke | 106/22 |

FOREIGN PATENT DOCUMENTS

| | | |
|---|---|---|
| 0097823 | 1/1984 | European Pat. Off. |
| 147257A | 7/1985 | European Pat. Off. |
| 2101864 | 7/1972 | Fed. Rep. of Germany |
| 2441478 | 3/1975 | Fed. Rep. of Germany |
| 2753816 | 6/1978 | Fed. Rep. of Germany |
| 49-80708 | 7/1974 | Japan |
| 55-54368 | 4/1980 | Japan |
| 55-468 | 1/1981 | Japan |
| 129274 | 6/1981 | Japan |
| 113462 | 9/1981 | Japan |
| 166274 | 2/1982 | Japan |
| 23665 | 5/1982 | Japan |

OTHER PUBLICATIONS

Chemical Abstract No. 95:229337z, "Preparation of Hectographic Plates", 74-*Radiation Chem. Photochem.*, vol. 95, p. 643 (1981).
*Industrial Waxes*, H. Bennett, vols. 1 and 2, Chemical Publishing Co., Inc., New York, N.Y. (1975).
The Condensed Chemical Dictionary.
Owens, "New Ink-Writing Methods for Graphic Recording", Instruments & Control Systems, vol. 38, pp. 100-102, Jul. 1965.
Hendricks, "Ink Splitter for Hot Melt Ink, IBM Technical Disclosure Bulletin, vol. 28, No. 3A, pp. 947-948, Aug. 1983.
Sweet, Richard G., "High Frequency Oscillography with Electrostatic Deflected Ink Jets", Stanford Electronics, Ltd., Technical Report No. 1722-1, Mar. 1964.
Handbook of Chemistry and Physics, 49th edition.
Abstract No. J55145-774, "Low Softening Point Ink for Ink-Jet Recording Contains Water Soluble Dye, Polyhydric Alcohol & Aliphatic Monohydric Alcohol".
Abstract No. 800333, "Recording Medium for Ink Jet Recording Process Comprises Colourant, Solvent and a Substance that Liberates a Vapour When Heated".
Abstract No. 35067C/20, "Ink Jet Recording Head—with Heating Element at Junction of Liquid Inlet and Inclined Expulsion Zone".
Abstract No. 89298X/48, "Ink Compsns for Ink Injection Type Recording Appts-Prepared by Dissolving or Dispersing Oil Soluble Dye Dissolved in Liquid Fatty Acid in Aromatic Hydrocarbon Opt. Contg. Nonionic Surfactant".
Abstract of Jap. Ser. No. 77/17,758, "Magnetic Ink-Jet Printing Process".
Derwent Abstract Accession No. 86187V/50, Japanese Pat. No. J77-013127.

*Primary Examiner*—Amelia Burgess Yarbrough
*Attorney, Agent, or Firm*—Woodcock Washburn Kurtz Mackiewicz & Norris

[57] ABSTRACT

A stearic acid-containing ink jet ink for use in an ink jet apparatus which features good print quality. The ink jet ink is discharged from the ink jet ink apparatus at elevated temperatures above ambient.

9 Claims, No Drawings

STEARIC ACID-CONTAINING INK JET INKS

This application is a divisional application of Ser. No. 803,038, filed Nov. 27, 1985, abandoned which in turn is a continuation of prior application Ser. No. 565,124, filed Dec. 23, 1983, abandoned which in turn is a divisional of Ser. No. 394,153, filed July 1, 1982 (now abandoned) of A. Robert Lin, Richard G. Whitfield, and Theodore M. Cooke, for "Stearic Acid-Containing Ink Jet Ink".

Application Ser. No. 565,124 abandoned is a continuation-in-part of application Ser. No. 507,918, filed in the names of Alfred R. Merritt, Theodore M. Cooke, A. Robert Lin and Richard G. Whitfield on June 27, 1983 for a "Natural Wax Containing Ink-Jet-Ink", now U.S. Pat. No. 4,484,984, which in turn is a continuation of application Ser. No. 331,604, filed in the names of the same inventors on Dec. 17, 1981, now U.S. Pat. No. 4,390,369. The present application is also related to application Ser. No. 610,627, filed in the names of Alfred R. Merritt, Theodore M. Cooke, A. Robert Lin and Richard G. Whitfield, on May 16, 1984 for "A Demand Ink-Jet Utilizing a Vase Change Ink and Method of Operating", which in turn is a continuation-in-part of application Ser. No. 507,918, filed June 27, 1983.

FIELD OF THE INVENTION

This invention relates to improved ink jet inks, and more particularly to ink jet inks that contain stearic acid.

BACKGROUND OF THE INVENTION

Ink jet inks many times provide marginal print quality. This is so, because water-based ink jet inks generally have poor penetration and drying characteristics with respect to the paper.

On the other hand, oil-based inks have low surface tension and usually provide ink dots which are too large to give good print quality.

The present invention seeks to formulate ink jet inks which can provide small, circular dots on many paper media. These small circular dots will produce characters having good edge definition, and contrast, and hence, characters of good print quality.

The present invention proposes to use stearic acid as a major base component of ink jet inks. The stearic acid of this invention may be considered a synthetic wax or a natural wax.

Commercial stearic acid is not a chemically pure compound, but a mixture of fatty acids in which stearic acid predominates.

Stearic acids are chiefly produced from saponified and distilled animal fatty acids. These fatty acids are usually composed of approximately 60% liquid and 40% solid acid. The bulk of the liquid acids is separated from the solid acids by hydraulic pressing. From the first pressing single-pressed stearic acid is obtained, from the second pressing, double-pressed stearic acids, and from the third pressing, triple pressed stearic acids. Each successive pressing removes additional liquid fatty acids, thus increasing the purity and quality of the resulting solid stearic acid. The liquid acids present are unsaturated and the solid acids, saturated.

Wax-containing ink jet inks are usually solids or semi-solids at ambient temperature, and therefore, require to be discharged from an ink jet apparatus at elevated temperatures. The heated ink fluid will solidify when it comes in contact with its paper target. The rate of solidification of the wax-containing ink will control the degree of penetration into the paper, usually a small circular dot will result. As a general rule, inks containing wax as a major component thereof, will have less penetration into the paper than inks containing additive amounts of wax.

A definition of "waxes" can be found in *Industrial Waxes* by H. Bennett; Volumes 1 and 2; Chemical Publishing Company, Inc., New York, NY (1975). Bennett defines a wax as "an unctuous solid with varying degrees of gloss, slipperiness and plasticity, which melts readily".

Natural waxes may be of vegetable, animal, or mineral origin. Modified waxes are natural waxes that have been treated chemically to change their nature and properties. Synthetic waxes are made by the reaction or polymerization of chemicals. Compounded waxes are mixtures of various waxes or of waxes with resins or other compounds added thereto.

There is considerable misunderstanding as to the nature and classification of fats, waxes, gums, and resins. For example cocoa butter, although it is actually a fat, is commonly considered as a wax because of certain characteristic properties. On the other hand, wool wax, derived from lanolin, is technically a wax but, because of its properties, it is usually considered as a fat. Kauri gum is commonly called a wax; and so on.

DISCUSSION OF RELATED ART

A hot melt ink for use in an ink jet apparatus is taught in U.S. Pat. Nos. 3,653,932 and 3,715,219, respectively.

The major component of the hot melt ink is a didodecyl-sebacate which is a highly viscous, synthetic substance.

As compared with the present invention, the didodecyl-sebacate is a synthetic substance which is disclosed as having a viscosity within a range having an upward limit of 50 centipoises and a resistivity within the range of $10^6$ to $10^{11}$ ohm-centimeters.

In a Japanese Abstract, Rico J56166-274, the use of stearic acid in an oil-in-water emulsion ink fluid is suggested. This aqueous ink uses only small amounts of fatty acids in its formulations, and is not meant to operate as a hot melt (wax) ink.

BRIEF SUMMARY OF THE INVENTION

The invention pertains to a non-aqueous ink jet ink composition comprising stearic acid in an approximate weight range of from 50 to 99 percent. The wax-containing composition is discharged from an ink jet apparatus at an elevated temperature above ambient. The stearic acid ink of this invention may be defined either as a "synthetic or a natural wax".

The ink composition can contain oleic acid in combination with the stearic acid. The stearic acid may be the basic fluid vehicle of the ink or may be used as an additive to other fluidic vehicles such as fatty acids, and more particularly oleic acid, and oleic acid with benzyl ether, etc.

Within the definition of the stearic acid wax of this invention are also included compounded or chemically modified waxes which may include natural or other synthetic substances.

A coloring agent or dye such as an oil or solvent soluble dye is usually added to the composition for visibility.

It is an object of this invention to provide improved ink formulations for use in ink jet apparatuses;

It is another object of the invention to provide a stearic acid wax-containing non-aqueous ink for an ink jet, which ink can give a small dot of good circularity;

It is a further object of this invention to provide a wax-containing ink for use in an ink jet, particularly an impulse ink jet, which ink will provide dots of good print quality.

These and other objects of this invention will become more apparent and will be better understood with respect to the following detailed description.

DETAILED DESCRIPTION OF THE INVENTION

Generally speaking, the invention is for an ink composition containing stearic acid, which composition is to be discharged from an ink jet apparatus at elevated temperatures above ambient.

Inks of this type have been found to provide highly repetitive dots of small size and extremely good print quality. Print quality is generally a measure of the circularity of the dot. The present inventive synthetic, natural and synthetic-natural waxes (compound waxes) provide circularities of 0.7 or better as measured by the technique described in U.S. application Ser. No. 248,551; filed Mar. 27, 1981; now Pat. No. 4,361,843; which technique is meant to be incorporated herein by way of reference.

The ink formulations of this invention find particular applicability in impulse ink jet apparatuses, but not limited thereto.

Stearic acid as an ink jet vehicle has the advantage of good dye solubility, viscosity vs. temperature relationship and good compatibility to a wide range of vehicles. The stearic acid also has a functional group, COOH, which has good affinity to paper. Thus, it will prevent the ink flaking off from the paper.

The stearic acid can be used in a hot melt ink. Because the ink changes from liquid to solid when it hits the paper, the ink/paper interaction has been minimized. The dots are very consistent so that it gives good print quality on almost any kind of paper.

Specific ink formulations which have been found to provide this good ink dot circularity are presented in Table I below:

provide inks which result in the finest print quality in the ink jet art.

Other natural waxes such as Japan wax, candelilla wax and/or caruauba wax can be blended with stearic acid to produce an acceptable ink for an ink jet apparatus.

The above formulations are, however, meant to be only exemplary, and are meant to provide a general teaching and understanding of the invention.

What is meant to be protected by way of Letters Patent is presented by the following appended claims.

What is claimed is:

1. A method of impulse ink jet printing comprising the step of jetting a non-aqueous ink jet ink composition, said ink being selected to contain at least stearic acid in an approximate weight percentage range from 50.0 to 99.0, said composition being discharged from an ink jet apparatus as a liquid at an elevated temperature above ambient.

2. The impulse ink jet printing method of claim 1, when said ink is selected to comprise oleic acid.

3. The impulse ink jet printing method of claim 1, wherein said ink is selected to comprise a mixture of waxes.

4. The impulse ink jet printing method of claim 1, wherein said ink is selected to comprise a natural wax in combination with said stearic acid.

5. The impulse ink jet printing method of claim 1, wherein said ink is selected to comprise a chemically modified or compounded wax.

6. The impulse ink jet printing method of claim 4, wherein said natural wax is selected from a group of waxes consisting of: Japan wax, candelilla wax, and carnauba wax.

7. The impulse ink jet printing method of claim 1, wherein said ink is selected to comprise at least one dye or coloring agent.

8. A method of impulse ink jet printing comprising the jetting of a non-aqueous ink jet ink composition comprising stearic acid as a major component thereof, said composition being discharged from an ink jet apparatus as a liquid at an elevated temperature above ambient to form, when permitted to solidify, dot sizes having an average circularity of at least 0.7.

9. A method of impulse ink jet printing comprising the jetting of an ink jet ink composition comprising

TABLE I

| | | | | | | |
|---|---|---|---|---|---|---|
| Stearic Acid | 85 | 97 | 60 | 60 | 65 | 75 |
| Oleic Acid | — | — | 20 | 20 | — | — |
| Typophor Black | 15 | — | 20 | 40 | 15 | — |
| Calco Nigrosine Base | — | 3 | — | — | — | 5 |
| Vis. Solid/Room Temp. | 11.4 (75° C.) | 1.4 (70° C.) | 10.5 (75° C.) | 10.1 (75° C.) | — | — |
| Wax #2** | — | — | — | — | — | 20 |
| Wax #3** | — | — | — | — | — | 20 |
| Vis. | — | — | — | 65° C. | 18.4 | 9.0 |
| | — | — | — | 75° C. | 13.4 | 7.7 (70° C.) |
| | — | — | — | 85° C. | 10.2 | |
| Dot Size* | 4 mil/ 2 mil orifice | 4 mil/ 2 mil orifice 6 mil/ 3 mil orifice | | | | |

*The dot size data is generally independent of target substrate materials (paper) but will vary to a slight degree with different ink jet apparatuses.
**The waxes designated No. 2 and No. 3 are the product of Strahl & Pitsch, Inc. 230 Great East Neck Road, West Babylon, N.Y. 11704.

The above ink formulations provide dots which produce characters approaching typewriter quality printing. As such, the above formulations are believed to stearic acid as a major component thereof, said composition having a maximum viscosity of 35 centipoises at a temperature in an approximate range of 40° C. to 90° C.

* * * * *